No. 730,916. PATENTED JUNE 16, 1903.
W. K. HOLMES.
CAMERA SHUTTER.
APPLICATION FILED MAR. 9, 1903.
NO MODEL.
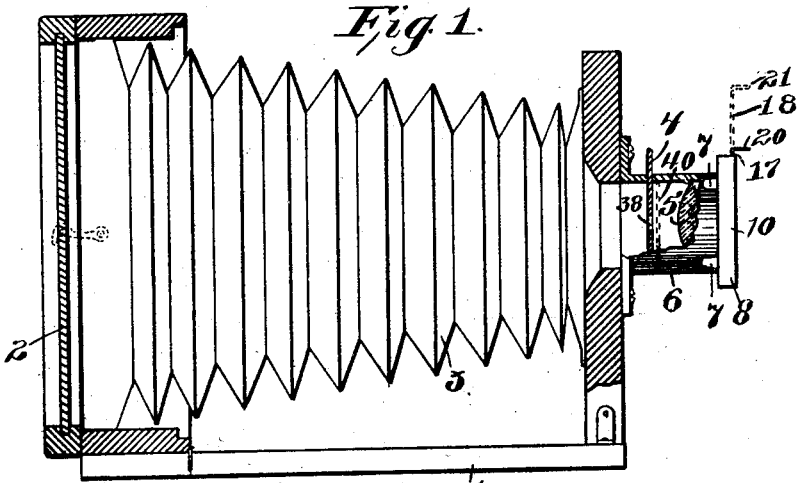
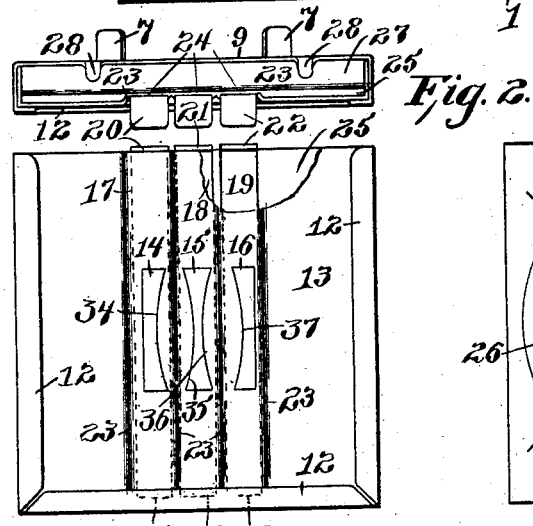
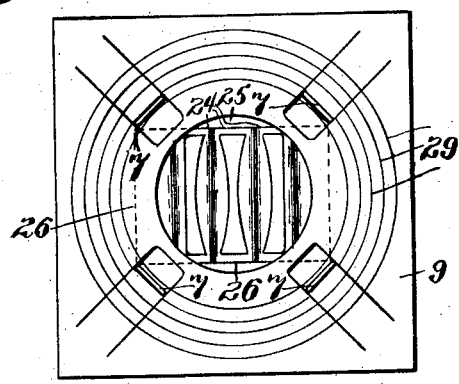
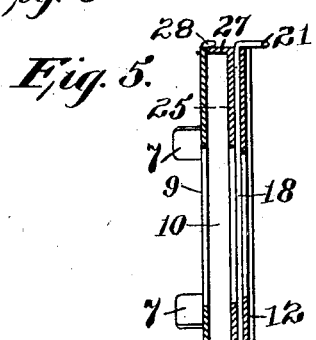
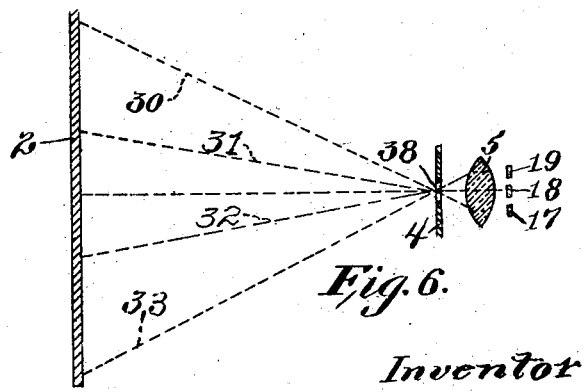
Witnesses:
Calderon C. Fuss
R. W. Pittman
Inventor:
William K. Holmes.
By his Attorney,
F. H. Richards No. 730,916.

Patented June 16, 1903.

UNITED STATES PATENT OFFICE.

WILLIAM K. HOLMES, OF NEW YORK, N. Y.

CAMERA-SHUTTER.

SPECIFICATION forming part of Letters Patent No. 730,916, dated June 16, 1903.

Application filed March 9, 1903. Serial No. 146,811. (No model.)

*To all whom it may concern:*

Be it known that I, WILLIAM K. HOLMES, a citizen of the United States, residing in the borough of Brooklyn, city of New York, in the county of Kings and State of New York, have invented certain new and useful Improvements in Camera-Shutters, of which the following is a specification.

This invention relates to cameras and screens or shutters therefor; and its object is to provide means for taking a freak photograph—such, for instance, as one showing the same person a number of times upon the same background—or for producing cloud effects or scenes with unequal light in different portions thereof.

My invention may also be employed for other purposes.

In the drawings forming part of this specification, Figure 1 is a sectional elevation of a camera, showing my improvements applied thereto. Fig. 2 is a plan, Fig. 3 a front view, and Fig. 4 a rear view, of a frame adapted to be attached to the lens tube or carrier of a camera and carrying certain screens and other parts, which will presently be explained. The shutters are, however, omitted from Fig. 4. Fig. 5 is a sectional view of the device shown at Figs. 2, 3, and 4; and Fig. 6 is diagram showing a photographic plate, a diaphragm, a lens, and a series of shutters, and also illustrating the effect upon the plate of opening the various shutters.

In the several views like signs denote like parts.

In practicing my invention according to the present method I make an exposure upon a photographic plate of one portion of a scene or setting. I then close the aperture through which such exposure was made and proceed to effect any desired rearragement or change in the setting, and then make an exposure through another aperture of another part of the setting upon the same photographic plate. I then close the aperture through which said second exposure is made, and if further changes are desired I then effect them and then make an exposure of a third part of the setting through a third aperture, and so on for as many exposures as may be desired. By this means I secure upon a single plate the same background as would be made in a camera of the ordinary type, while in the foreground the various changes are shown with every appearance of reality.

To illustrate: Before the first exposure is made a person may be standing in the left-hand portion of the setting, at the second exposure the same person may be standing at the middle of the setting, and at a third exposure he may be standing at the right-hand portion of the setting, so that the photograph will show triplets upon a single background. Many other effects may of course be produced.

At Fig. 1 is shown a camera 1, having a photographic plate 2, bellows 3, diaphragm 4, lens 5, and lens-carrier 6. To the end of the latter I attach, by means of four projections 7, a frame 8, which may be in the form of a box, the rear side 9 whereof may be integral with side flanges 10 and bottom flange 11, said flanges at the front of the box being bent up at 12 to form lips for retaining an inserted screen 13. Said screen, which is preferably made of sheet metal, is provided with a series of apertures, preferably three in number, as at 14, 15, and 16, the aperature 15 being at the center and 14 and 16 at the extremes of the series. In this instance these apertures are in the form of slits, although my invention is not limited to such form. Behind the screen I provide three shutters, preferably in the form of narrow sheet-metal slides 17, 18, and 19, which are independently movable and are adapted to close any one or more of said apertures at will, said slides being provided with any suitable operating means—as, for instance, the bent handles 20, 21, and 22. In the screen 13, which is preferably fixed within the casing or frame 8, I strike up a suitable number of parallel ribs 23, and said slides lie within the grooves 24 which occur between said ribs, as will be seen at Fig. 2. The screen is removably inserted in the box, so that it may be taken out at will and replaced with other screens having other apertures and provided with corresponding shutters. Hence a series of screens may be employed, if desired, in making a single photograph, each screen being different from the rest.

For holding the slides in the grooves I provide a plate or screen 25, at the middle portion of which is an aperture 26, which may be substantially coextensive with the field occupied by the series of slits 14, 15, and 16 in the adjoining screen 13, so that the plate 25, while confining the slides, may not interfere with the exposure. Said plate 25 may fit closely within the casing and at its upper edge may be bent rearwardly at 27 to close the top of the box, and ears 28, formed upon the back face of the box, may be bent over said part 27 for retaining the same, a space of about an eighth of an inch being preferably left between the plate 25 and the rear side of the box to keep the screen 13 at a sufficient distance in front of the lens to avoid liability of sharp shadows of the apertures being cast upon the photographic plate 2. Said space also gives clearance for other devices commonly placed upon the front of the lens-tube.

For attaching the frame to a lens-carrier of a camera I prefer to form four bendable or adjustable projections 7 by cutting ears from the material of the casing and bending them up, these ears being flexible, and hence being adapted to fit upon tubes 6 of various diameters. I also prefer to mark upon this rear side of this casing a series of circles 29 for guiding the user in bending the ears so as to center or position the frame upon tubular lens-carriers of various diameters, all of the ears being, of course, bent up on a single selected circle 29. It will also be understood that the framing may be turned upon said tubular carrier so as to bring the slits 14, 15, and 16 into different positions or angles thereon, as may be desired.

In operation the shutters are withdrawn and the usual diaphragm-opening is slowly enlarged until the shadows cast by the edges of the slits upon the ground glass disappear. The opening should always be set at this point. Then the foreground of the setting is arranged as desired, and then one of the three or more shutters is drawn out, so as to expose only one portion of the setting upon the photographic plate 2. If at Fig. 6 the shutter 17 is drawn out, the exposure will be made through the first slit 14, Fig. 3, and would fall upon the field or portion of the photographic plate 2 which is included between the lines 30 and 31. It will be understood that this portion of the plate receives a strong exposure. If a weaker exposure is also made upon the remaining portions of the plate, it is immaterial if the remainder of the operation is properly conducted. Then the shutter 17 is closed and a rearrangement of the foreground of the setting is made. Thus, for instance, the person who first stands immediately in front or within the field of the aperture 14 may change his position so as to be immediately within the field of the aperture 15. Then the shutter 18 for said aperture may be withdrawn and an exposure made through said aperture of equal length to the exposure already taken, thereby covering the portion of the photographic plate 2 which is included between the lines 31 and 32.

It will be understood that upon the two described areas upon the photographic plate is thus exposed a single continuous background and that the changing of the foreground in the setting may be so effected that no portion of the second exposure is superposed upon the special foreground of the first exposure. Then the shutter 18 is closed and another suitable change is effected in the foreground, whereupon shutter 19 is opened and an exposure is made upon the remaining portion of the photographic plate 2—that is, the portion which is included between the lines 32 and 33, Fig. 6.

I prefer that the slits 14, 15, and 16 shall be equidistant and that the edge of each slit shall be inwardly curved upon each side thereof which adjoins another slit. Thus the slit 14 is inwardly curved at 34, the slit 15 at 35 and 36, and the slit 16 at 37. By this means a vignetting effect is produced, so that no line or break shows upon the photographic plate where the exposures taken successively through said apertures join upon said plate. A due amount of separation of the slit-screen 13 from the lens also conduces to this effect. My invention is not, however, limited to the use of curved edges which are smooth. When the slits or apertures have the proper relative position and form, the shadows cast thereby upon the usual ground glass dissolve together when the diaphragm-opening 38, Figs. 1 and 6, is enlarged, as already explained, and when they have the proper relative position and form no dividing line or mark appears upon the photographic plate. Thus it will be seen that I make upon one plate a succession of vignetting exposures of successive parts of the same setting and that after changing the setting in each instance an exposure of a different part of the setting is made without directly reëxposing the previously-exposed parts of the setting. Any suitable changes in the foreground may be made during the taking of the picture, according to the whim of the photographer.

It will also be noted that I provide a camera with means for shielding or screening successive portions of the photographic plate at successive exposures; that the screen 13 has a series of apertures, means being provided for covering any of said apertures at will, while leaving another aperture or apertures open; that the shutters 17, 18, and 19 are independently operable; that the slits or apertures are arranged in a row and so close together as to cause substantially uniform exposures to be made upon the photographic plate at the successive steps in the operation of taking a picture.

It will be understood that my invention includes the described improvements, whether built into a camera in the course of its manufacture or embodied in the form of an attachment to be marketed for use upon cameras.

Variations in construction and operation may be resorted to within the scope of my invention, and portions of my improvements may be used without others.

The usual camera-shutter is shown diagrammatically in dotted lines at 40, Fig. 1, and it may be operated in any usual manner after the proper adjustment of the scene or setting has been effected and the proper one of the shutters 17 18 19 has been withdrawn.

Having thus described my invention, I claim—

1. A camera provided with a screen in which is formed a series of apertures, the aperture or apertures which are located between the end apertures having inwardly-curving side edges, and means for closing said apertures.

2. A camera provided with a screen in which is formed a series of slits, the slit or slits which are located between the end slits having inwardly-curving substantially unbroken side edges, and means for closing said slits.

3. A camera provided with a screen in which is formed a series of apertures, the aperture or apertures which are located between the end apertures having inwardly-curving side edges, and the inner sides of the apertures at the extremes of the series also having inwardly-curving edges, and means for closing said apertures.

4. A camera provided with a screen in which the aperture-field is occupied by a series of slits arranged in a row and so close together as to cause substantially uniform exposure to be made upon the photographic plate, and means for closing one or more of said slits at will.

5. A camera provided with a screen in which is formed a series of three slits arranged in a row and sufficiently close together to enable a substantially uniform exposure to be made upon a photographic plate, the edges of said slits being inwardly curved upon each side thereof which adjoins another slit, and means for closing one or more of said slits at will.

6. A camera provided with a screen having a series of apertures, and closing means for said apertures, said apertures being of such relative shape, size and position that no line or break shows upon the photographic plate where the exposures taken successively through said apertures join.

7. A camera provided with a metallic screen having a series of apertures, struck-up ribs upon said screen between said apertures, a series of grooves being formed by said ribs and a series of shutter-slides lying in the grooves between said ribs.

8. A camera provided with a metallic screen having a series of apertures, struck-up ribs upon said screen between said apertures, a series of grooves being formed by said ribs, a series of shutter-slides, and means for holding the shutter-slides within said grooves.

9. A camera provided with a metallic screen having a series of apertures, struck-up ribs upon said screen between said apertures, a series of grooves being formed by said ribs, a series of shutter-slides lying in the grooves between said ribs, and means for holding the shutter-slides within said grooves; said shutter-holding means consisting of a plate in which is formed an opening substantially coextensive with the field occupied by said apertures.

10. A frame having means for attachment to a camera, a screen upon said frame, said screen having a series of apertures sufficiently close together to enable a substantially uniform exposure to be made upon a plate throughout the photographic-plate field, the edges of said apertures being inwardly curved upon each side thereof which adjoins another aperture, and means upon said frame for closing one or more of said apertures at will.

11. A frame provided with projections for engaging the lens-carrier of a camera, a screen upon said frame, said screen having a series of apertures, struck-up ribs upon said screen between said apertures, a series of grooves being formed by said ribs and a series of shutter-slides lying in the grooves between the ribs.

12. A frame provided with projections for engaging the lens-carrier of a camera, a screen upon said camera, said screen having a series of apertures, struck-up ribs upon said screen between said apertures, a series of grooves being formed by said ribs, a series of shutter-slides lying in the grooves between the ribs, and means for holding the shutter-slides within said grooves, said shutter-holding means consisting of a plate in which is formed an opening substantially coextensive with the field occupied by said apertures.

13. A frame having projections for attachment to a camera, a screen upon said frame, said screen having a series of apertures close together, and shutters mounted upon said frame for closing one or more of said apertures at will, said frame having a plate whereon are marked a series of concentric rings to guide the user in fitting the frame upon various sizes of lens-carriers, and said projections being adjustable to fit the lens-carriers of different diameters.

14. A frame having flexible projections for attachment to a camera, a screen upon said frame, said screen having a series of apertures, and shutters mounted upon said frame for closing one or more of said apertures at will.

15. In a camera, a screen having a series of apertures, means for covering any of said apertures at will while leaving another aperture or apertures open, and a holder from which said screen may be removed, so that a different screen may be substituted.

16. In a camera, a screen having a series of apertures, a shutter for each aperture, the shutters being independently operable, and a lens, said screen being mounted at a sufficient distance in front of the lens to avoid liability of sharp shadows of the apertures being cast upon the photographic plate.

17. A camera provided with a screen in which is formed a series of equidistant apertures, the aperture or apertures which are located between the end apertures having inwardly-curving side edges, and means for closing said apertures.

18. A camera provided with a revoluble screen in which is formed a series of apertures, and means for closing said apertures.

19. A camera provided with a revoluble and detachable screen in which is formed a series of apertures, having inwardly-curving side edges, and means for closing said apertures.

20. A camera provided with a screen in which the aperture-field is occupied by a series of elongated apertures arranged in a row close together and equidistant, and means for closing one or more of said apertures at will.

21. A camera-screen in which is formed a series of equidistant slits arranged in a row and close together, the edges of said slits being inwardly curved upon each side thereof which adjoins another aperture, said screen being provided with means for closing one or more of said slits at will.

22. A camera provided with a holder, a metallic screen detachably mounted in said holder and having a series of apertures, struck-up ribs upon said screen between said apertures, and a series of shutter-slides lying in the grooves between said ribs.

23. A camera provided with a metallic screen having a series of apertures, struck-up ribs upon said screen between said apertures, a series of shutter-slides lying in the grooves between said ribs, and means for holding the screen and also for holding the shutter-slides within said grooves; said holding means comprising means for retaining the edges of the screen, and also a plate upon the other side of the screen, in which plate is formed an opening substantially coextensive with the field occupied by said apertures, said screen being detachably supported by said holding means.

24. A frame having means for attachment to a camera, a screen detachably mounted upon said frame, said screen having a series of apertures, and being provided with shutters for closing one or more of said apertures at will.

25. A frame having means for attachment to a camera, a screen detachably mounted upon said frame, said screen having a series of equidistant apertures close together, the edges of said apertures being inwardly curved upon each side thereof which adjoins another aperture, and means also detachable from said frame for closing one or more of said apertures at will.

26. A frame having means for attachment to a camera, a detachable screen upon said frame having a series of equidistant apertures, and independently-operable detachable shutter-slides for said apertures, guides for said slides being provided upon said screen.

27. A frame having a base and projections thereon for engaging the lens-carrying tube of a camera, and provided with two screens, whereof one has a series of apertures and is well separated from said base so as to avoid liability of shadows or lines being produced upon the photographic plate by the edges of said apertures, the other screen having an opening substantially coextensive with the field occupied by said apertures, and shutters mounted between said screens for closing any or all of said apertures at will.

28. A rotatable frame having a base and projections thereon for engaging the lens-carrying tube of a camera, and provided with two screens, whereof one is detachable and has a series of apertures and is well separated from said base so as to avoid liability of shadows or lines being produced upon the photographic plate by the edges of said apertures, the other screen having an opening substantially coextensive with the field occupied by said apertures, and shutters mounted between said screens for closing any or all of said apertures at will.

29. A frame having projections for attachment to a camera, a screen upon said frame, said screen having a series of apertures, and shutters carried by said frame for closing one or more of said apertures at will, said projections being bendable, and said frame having a plate whereon are marked a series of concentric rings to guide the user in bending the projections to fit various diameters of lens-carriers.

WILLIAM K. HOLMES.

Witnesses:
B. C. STICKNEY,
FRED. W. BARNACLO.